United States Patent [19]

Olsen

[11] Patent Number: 4,639,345

[45] Date of Patent: Jan. 27, 1987

[54] INTERLOCKING BUILDING BLOCK SYSTEM

[76] Inventor: Randolffa R. Olsen, P.O. Box 4615, Harare, Zimbabwe, South Africa

[21] Appl. No.: 478,554

[22] Filed: Mar. 24, 1983

[30] Foreign Application Priority Data

Mar. 24, 1982 [GB] United Kingdom ............... 82/08626

[51] Int. Cl.[4] .......................... B29C 33/40; B28B 7/36

[52] U.S. Cl. .................................... 264/226; 249/112; 249/119; 264/225; 264/261; 264/263; 264/333; 264/338; 425/175; 425/179

[58] Field of Search ............... 264/220, 225, 219, 226, 264/274, 261, 262, 333, 338, 263; 249/112, 120, 13, 119; 425/175, 179

[56] References Cited

U.S. PATENT DOCUMENTS

| | | | |
|---|---|---|---|
| 849,214 | 4/1907 | Daughebaugh et al. | 249/112 |
| 3,228,650 | 1/1966 | Gilliland et al. | 264/225 |
| 3,290,421 | 12/1966 | Miller | 264/219 |
| 3,380,121 | 4/1968 | Chittenden et al. | 249/112 |
| 3,683,486 | 8/1972 | Rope et al. | 264/225 |
| 4,231,982 | 11/1980 | Jansson | 264/227 |
| 4,300,746 | 11/1981 | Schoen | 249/13 |
| 4,343,453 | 8/1982 | Rodon | 249/120 |

FOREIGN PATENT DOCUMENTS

| | | |
|---|---|---|
| 747873 | 8/1970 | Belgium . |
| 2434690 | 3/1980 | France . |
| 650716 | 2/1951 | United Kingdom . |
| 784702 | 10/1957 | United Kingdom . |
| 900570 | 7/1962 | United Kingdom . |
| 966432 | 8/1964 | United Kingdom . |
| 1485852 | 9/1977 | United Kingdom . |

*Primary Examiner*—Donald Czaja
*Assistant Examiner*—Mary Lynn Fertig
*Attorney, Agent, or Firm*—Cushman, Darby & Cushman

[57] ABSTRACT

A dry wall interlocking building block system includes a method of manufacturing moulds for casting building blocks, in which master forms corresponding in shape and size to the required blocks are cast from a cold-pouring compound in collapsible core-boxes, and in which a mould is built up around the master forms (7) by securing the forms to a casting table (8), placing metal liner plates (9) against the sides of the forms, filling the spaces around the liner plates with a similar cold-pouring compound, allowing the compound to set, and withdrawing the forms to leave a plurality of mould cavities. The mould can then be mounted in a block making machine for large scale casting of concrete blocks in the mould cavities. One feature of the preferred mould is that the liner plates are detachable, countersunk bolts (10) having been fitted in holes in the liner plates (9) prior to filling the spaces around the plates. The invention also includes a two-recess building block cast in the above mould.

14 Claims, 17 Drawing Figures

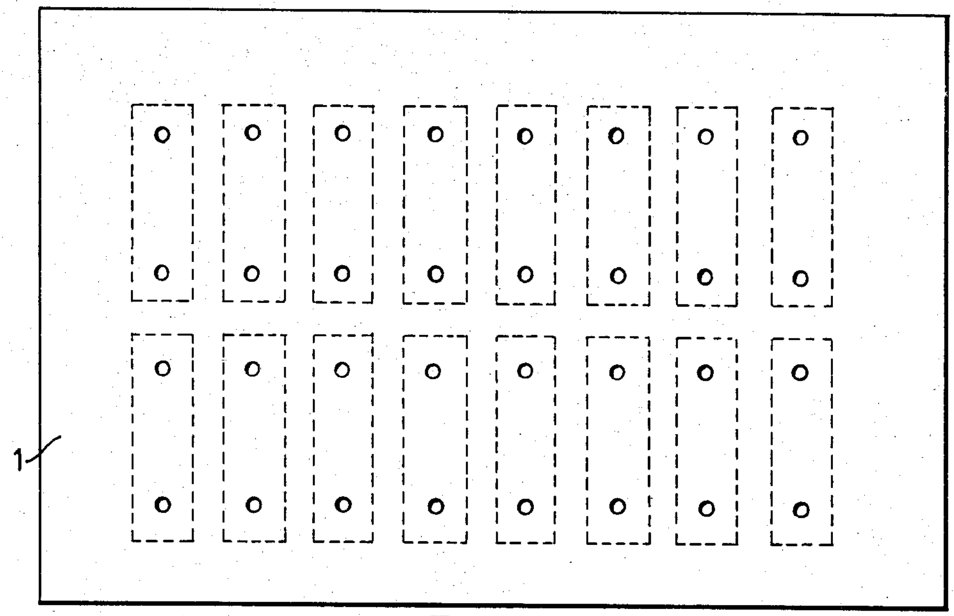
Fig.1.
Fig.2b.
Fig.2a.
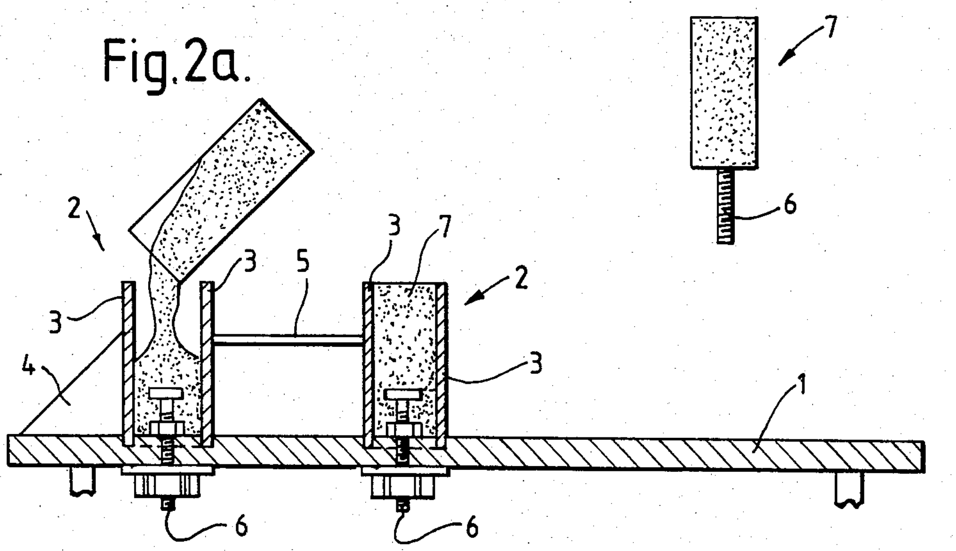

INTERLOCKING BUILDING BLOCK SYSTEM

This invention relates to interlocking building blocks and to methods of manufacturing them.

Construction of buildings by means of dry interlocking blocks is well known, especially in developing countries where the methods of assembly can be carried out largely by unskilled labour. However, the sucess of known dry wall block systems has been limited due to the difficulties of manufacturing large quantities of blocks to sufficiently close dimensional tolerances so that the assembly process is both quick and reliable and results in a structure which is strong, durable and versatile. The shapes of known double-skin interlocking blocks have tended to produce wall structures which are comparatively unattractive aesthetically and which have no or insufficient overlap between blocks of the same skin, whether on the inner or outer faces, for optimum strength and for good sealing, at least without reinforcing bars.

Known methods employed for the manufacture of mould boxes for the extrusion of pre-cast cement building blocks, particularly of a rectangular configuration, have normally used mild steel plating or metal casting (requiring machining afterwards) welded together in conformity with the particular block shape. Variable plate thicknesses and/or decomposable mould sections are used, and all sections are then fitted together to provide mould boxes which are finally bolted or welded together into one solid form with as many voids as is determined by the type of block machine the mould box or boxes are suited for.

It is the accepted practice of mould box manufacturers in general not to be too concerned about distortion within the completed mould boxes resulting from the welding together of all the relevant sections of the mild steel or other sections making up the final mould boxes, since any inaccuracies resulting from distortion through the welding of the particular sections within the respective moulds would be taken up by the cement mortar after the cement blocks have dried out and cured in the normal manner. This practice, in fact, has been in existence for a very long time and it still in current practice, for pre-cast building components where cement mortar is used in the construction of buildings.

However, many attempts have been made to manufacture mould boxes to sufficiently close tolerances and exactitude for the extrusion of building components of dry-wall interlocking systems and these have been generally unsuccessful, due to the distortion resulting from the welding process inherent in the manufacturing process. Machining is the only remedial measure, but this still does not resolve the problem and is expensive.

According to one aspect of this invention a method of manufacturing a mould for the casting of dry-wall building blocks comprises the steps of: (i) moulding at least one master form of a shape and to dimensions corresponding to those of the finished block, (ii) positioning a plurality of metal liner plates against the side faces of the or each master form; (iii) filling the space around the or each master form to a required height with a liquid casting compound which is then allowed to set; and (iv) removing the or each master form to leave a female mould having one or more mould cavities whose operative surfaces are formed at least in part by the surfaces of the liner plates originally placed against the master form or forms.

The master form or forms may be cast from a similar liquid casting compound by providing a collapsible female core-box, pouring the casting compound into the assembled core-box, and allowing the compound to set, and then disassembling the core-box.

The casting compound is preferably a cold-pouring compound comprising an alkali base to which an acid hardener is added immediately prior to pouring.

The liner plates are preferably pre-drilled and countersunk on their inwardly facing surfaces so that the finished female mould has replaceable liner plates fixed by countersunk screws threaded into the body of the mould, resulting in a mould-box of comparative dimensional accuracy.

For manufacture of blocks, the mould is mounted in a block making machine for moulding concrete blocks.

According to a second aspect of the invention there is provided a method of manufacturing interlocking concrete blocks for the construction of dry-wall structures, in which graded sand is mixed with cement in batches each containing a predetermined mass of sand and a predetermined mass of cement, and wherein a predetermined amount of water is added progressively to each batch and mixed therewith for a predetermined time. The batched mix is then transferred to a supply receptacle of the block making machine which fills a mould or moulds therein with the mixture, the time lapse between the first contact of the cement/sand mixture with water and the forming of blocks in the mould or moulds being less than ten minutes and preferably not more than five minutes. Following block formation, the blocks are removed from the machine and cured in a high-humidity atmosphere for a period of at least 24 hours, and preferably for ten days, after which they are allowed to dry.

According to a third aspect of the invention there is provided a building block of constant cross section, the section containing at least two recesses side by side, each recess being bounded by a flange on either side thereof, and each recess and flange being shaped to mate with a corresponding flange and recess in a similar block. In a block shaped to form part of an outer layer of a straight wall, the outer face is generally planar and the inner face has three flanges comprising a first flange forming a side edge portion of the block, a second flange or flange pair located between the two recesses, and a third flange forcing an opposite side edge portion. The flanges are shaped to interlock with corresponding flanges on a block of another layer so that the latter block can only be interlocked or separated with the block of the outer layer by moving one block relative to the other in a direction parallel to the sides of the blocks.

In a first preferred block system, the majority of the blocks have paired recesses in which the interlocking surfaces of one recess are at the same distance from the opposite face of the block as the corresponding surfaces of the other recess. This allows blocks of the same configuration to be arranged in courses, such that the blocks in one course of a layer bridge the joints between blocks of the course below. the courses of the said layer at the same time being staggered relative to the courses of a juxtaposed interlocking layer. This has a number of advantages which will become evident from the description hereinafter. The same staggered relationship can be obtained with blocks in which the recesses of a pair are at different distances from the opposite face, but this necessitates the use of differently arranged or shaped blocks in each consecutive course within the particular block system. The dual recess configuration can also be used to create relatively large voids between layers which can be filled with thermal insulation material.

The invention will now be described by way of example with reference to the drawings in which:

FIG. 1 is a plan view of a drilled casting table;

FIG. 2*a* is a sectional side view of the casting table of FIG. 1 illustrating the moulding of master forms;

FIG. 2*b* is a side view of a master form after moulding;

Figures 7, 8A, 8B, 8C, 8D, 8E, 8F, 8G:
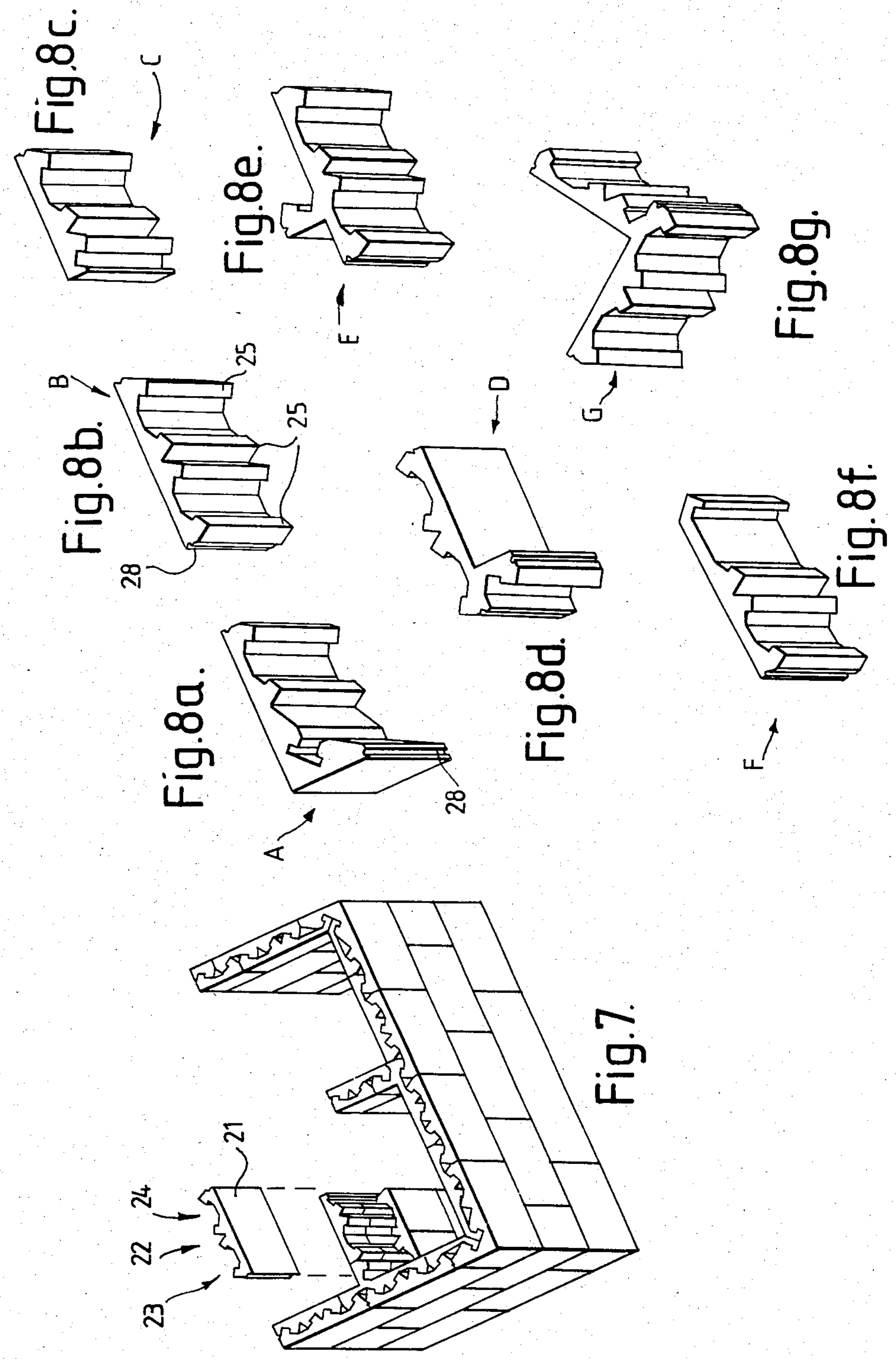
FIG. 7 is a perspective view of a wall section constructed from blocks in accordance with the invention.
Figure 9:
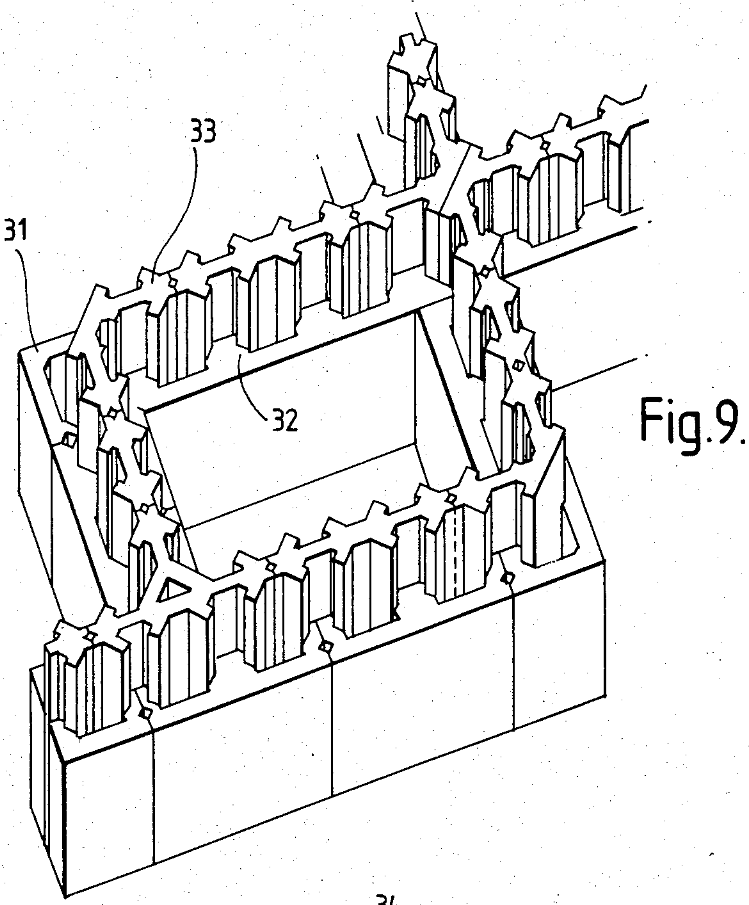
Figure 10:
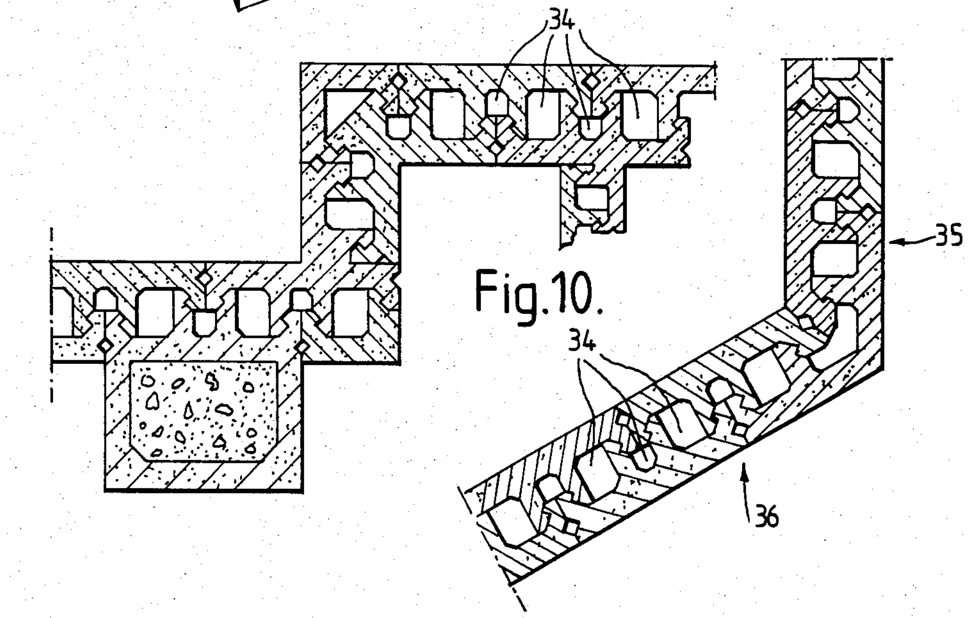

FIGS. 8*a* to 8*g* are perspective views of the individual blocks included in the wall section of FIG. 7;

FIG. 9 is a perspective view of a wall section constructed from blocks of a second configuration in accordance with the invention; and FIG. 10 is a plan view of wall sections using blocks of a third configuration in accordance with the invention.

1. METHOD OF MOULD MANUFACTURE.

The method of mould manufacture is described below with reference to FIGS. 1 to 6 which are generally diagrammatic in that, for clarity, they show moulds of a relatively simple shape which would not be used for making blocks of a shape in accordance with the invention.

Referring to FIG. 1, the mould manufacture begins with a casting table 1 drilled to accept bolts for locating a series of master forms, or 'plums' as they will be referred to hereinafter. Each plum is moulded on the table 1 as follows.

A cold-pouring compound is used, comprising an alkali base, to which an acid hardening additive is mixed in certain proportions and thoroughly stirred together in the required volume to be used for the size and shape of the unit to be manufactured. As is shown in FIG. 2*a*, the mixture is poured into a collapsible female core-box 2 constructed with either metal or hardwood sides 3 to the configuration desired, so as to retain the required shape until the compound has set firmly. Each side 3 is braced at the edge of the table 1 by a web 4 or against a neighbouring core-box side by a bridge 5. Projecting into each core-box 2 is a bolt 6 held in one of the drillings in the casting table by a lower nut and a lock nut providing a mandrel on which the plum is moulded. The configuration of the core-box 2 is such that the plum 7 produced is a replica of the finished pre-cast interlocking cement block to the dimensions required and which initially constitutes the master mould made up from the mixture of the cold-pouring compound referred to above. FIG. 2*b* shows the finished plum removed from the casting table.

Since a great amount of heat is generated in the mixing of the alkali and acid hardening agent, the mixture is continuously stirred to dissipate most of the heat generated. After approximately ten minutes, the compound is poured into the core-box 2 (which has previously been coated with a release agent) ensuring even filling of the core-box and, using a rod, the compound is worked around the desired configuration in a horizontal fashion to ensure the escape of gas bubbles resulting from the chemical reaction. The core-box is topped up in regular increments of 50 mm until it is filled. The mixture is then allowed to harden into a solid form by leaving it undisturbed for twenty-four hours.

The core-box 2 is then disassembled by removing the sides of the core-box, leaving the plum 7 from which subsequent mould boxes will be made.

The above process repeated to obtain the required number of "masters" according to the size of the mould box to be manufactured and, also to suit the type of blockmaking machine to which the mould box will be subsequently fitted.

Each plum 7 is identical in shape, size, dimensions and configuration to the interblocking blocks eventually to be moulded using the moulds manufactured in accordance with the invention.

Figure 3:
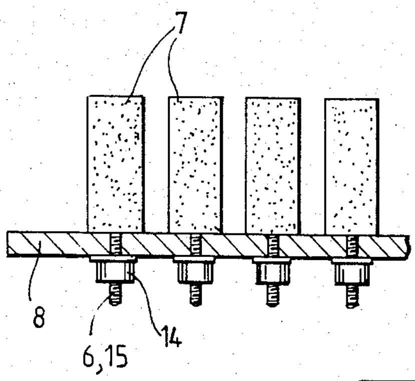
FIG. 3 is a sectional side view of the casting table with master forms bolted to the table.

Having made the required number of plums, these are then accurately positioned and bolted on a level casting table 8 as shown in FIG. 3 to the configuration of the required mould box dimensions, i.e. length, width and height.

Figure 4:
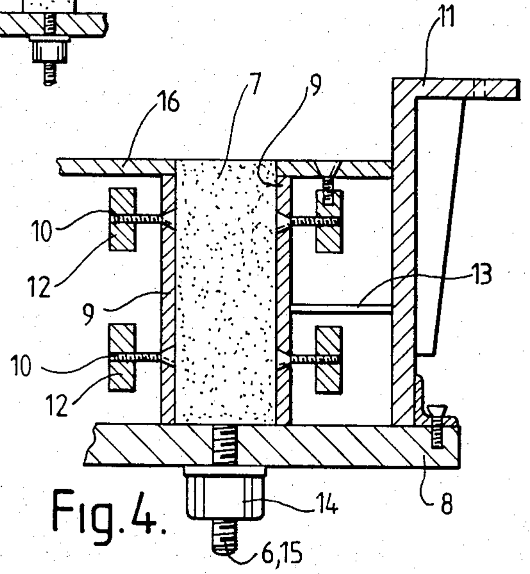
FIG. 4 is a sectional side view of a master form on the table with a mould lining built around the form.

Referring to FIG. 4, each plum 7 is faced with hard wearing tool steel, gauge plate or hard-chromed metal liners 9 which have been accurately cut to a required height, length and width. Each liner 9 is predrilled to accept countersunk screws 10 secured in mild steel blocks 12 located in the spaces behind the liner. In this way the plums 7, after having been located with a release agent, are faced on all exposed peripheral surfaces, except for the top and bottom faces. An outer mould box shell 11 is bolted to the casting table 8, and bracing sprags 13 fitted where necessary.

It should be noted that the liners 9 may be made from plates of different thicknesses, provided only that they are positioned close up against the surfaces of the plums 7.

Now a second, casting sequence using the cold pouring compound is performed, by filling around the metal lined plums 7 in 50 mm layers, so as to fill the voids between the plums vertically until the compound is at the correct height for the mould box. The compound is allowed to set for another 24 hours and, should shrinkage of the compound occur, it is topped up from time to time.

Removal of the plums 7 is carried out by unscrewing the nuts 14 and tapping bolts 15 from beneath thereby pushing each plum upwardly between the liners 9 to leave a mould cavity in which blocks will be cast. As this stage a protective cover 16 with apertures corresponding to the shape of the mould cavities is screwed to the top of the mould box.

Figure 5:
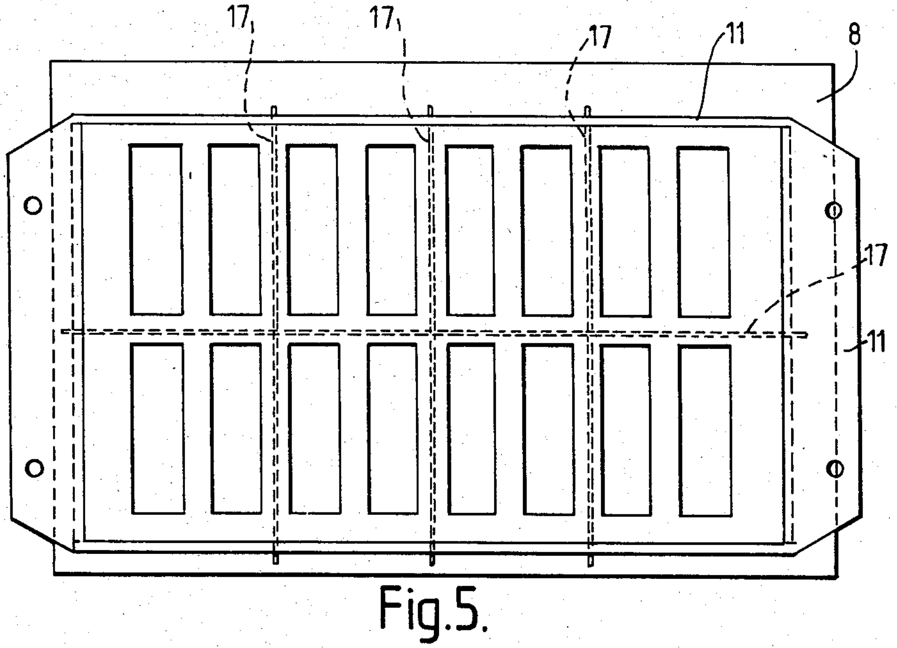
FIG. 5 is a diagrammatic plan view of a set of moulds manufactured by the process of FIGS. 1 to 4.
Figure 6:
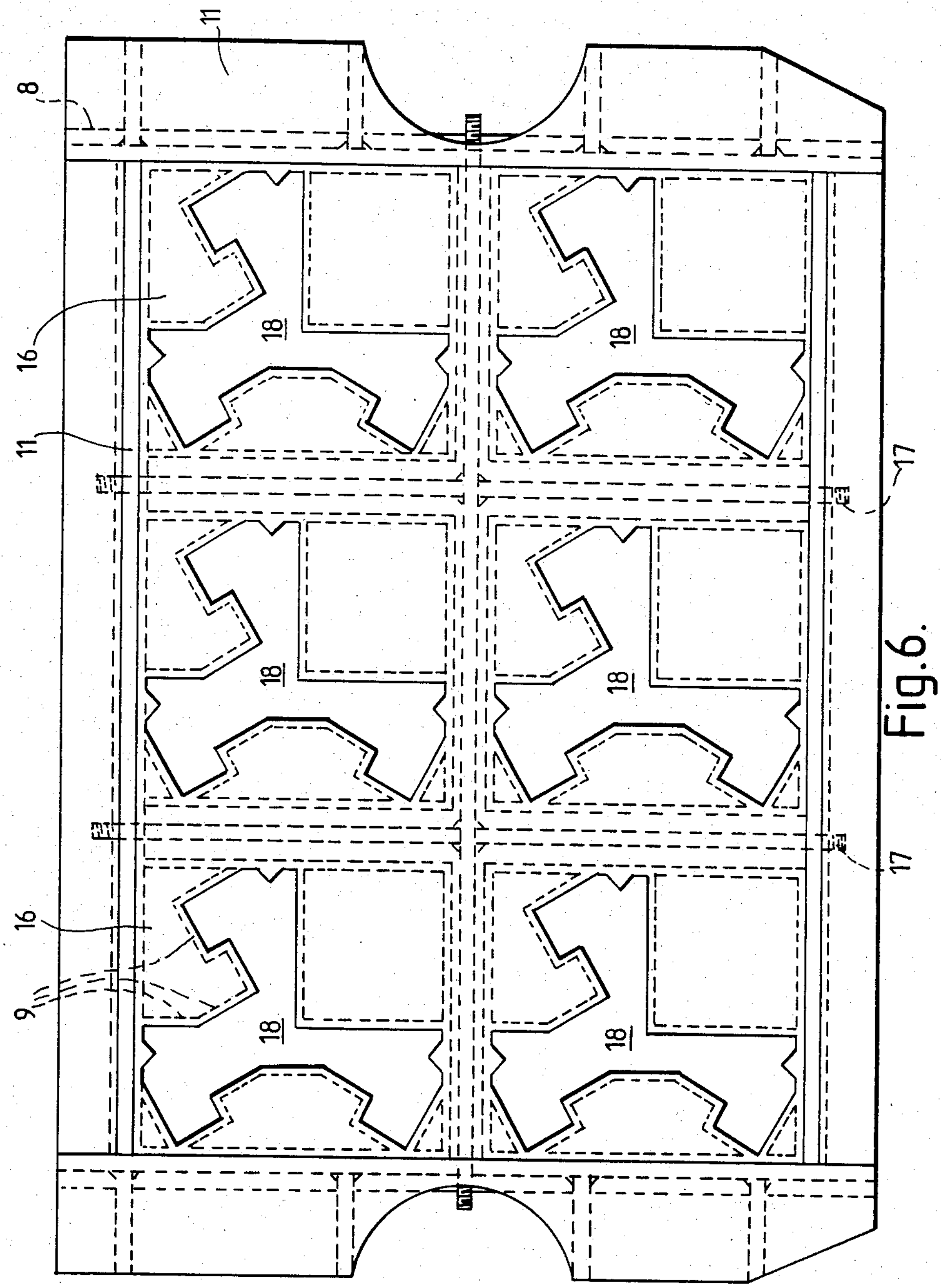
FIG. 6 is a plan view of a practical set of moulds manufactured in accordance with the invention.

The complete mould box is shown in plan in FIG. 5. In this embodiment, threaded bolts 17 span the length and width of the mould box as additional bracing for the shell 11.

A second mould box constructed by the method described above is shown in plan in FIG. 6. This mould box can be fitted in a known block making machine. It has six mould cavities 18 for moulding six identical building blocks in each moulding cycle of the machine.

When, after considerable usage of the mould boxes within the blockmaking machine, it is discovered that the liner plates have become worn, the liner plates can simply be removed by withdrawing the screws 10 and new liners fitted, obviating the manufacture of new mould boxes.

2. Method of block production (a) Riversand of a specified Fineness Modulus is delivered to the place of manufacture and when dry is allowed to pass a pair of sieves, resulting in three graded stockpiles.

(b) The preferred B.S. sieve sizes are 1180 and 300 respectively, and sand retained on both the sieves, as well as sand passing through the 300 sieve, is simultaneously collected in sand bins, each bin containing sand of a given fineness and each equipped with respective chutes and cut-off gates.

(c) The batching sequence of fine aggregate is then carried out by mass rather than volume, proportioning of the respective ingredients being related directly to batches of cement.

From the respective sand-grading, aggregate batches are made up as follows:

(i) sand retained by 1180 B.S. sieve: 25%±5% by mass;

(ii) sand retained by 300 B.S. sieve: 60%±5% by mass:

(iii) sand passed by 300 B.S. sieve: 15%±5% by mass.

The total mass of the above respective percentages is then mixed in with the fixed mass of Portland cement which, in turn, is discharged into an elevated Pan mixing unit, thus churning the ingredients already mentioned at a constant speed in a dry state for one minute.

(d) Water is then added gradually to the dry churning ingredients so as to obtain a cement: water ratio of 1.8 after three minutes of mixing time.

(e) The contents of the whole batched mix is then gravitated down chutes from the pan mixer into receiving bins or troughs of blockmaking machines which mould the blocks using the mould boxes described above. The blocks are moulded with either rough or smooth finishes. In the block-making machine, which is an automatic or manual palletised type, the aggregate is uni-directionally vibrated and hydraulically compressed in the moulds, the blocks then being extracted for curing.

The time lapse between the first contact by water with the cement and the newly-formed block elements is less than five minutes.

The average Particle Size Distribution in the blocks is: 1,4.

(f) Curing of the newly-made blocks is carried out by subjecting them to 100% humidity for a period of ten days from the day of manufacture and, thereafter, they are allowed to wind-dry in stacks, for carbonation to take place and possible shrinkage in the case of strong cement mixes.

After 30 days the blocks can be used for the erection of building structures.

3. Block configurations.

Referring to FIGS. 7 and 8, a wall section 20 is built up from blocks of a number of different shapes A to G. It will be seen that the plain blocks B used throughout the wall section, except at corners, wall junctions, and window and door apertures, each have a planar outer face 21 and a recessed inner face 22 with two identically shaped recesses 23 and 24. Each recess 23 and 24 is bounded by flanges 25 (FIG. 8*b*) which project inwardly so that the mouth of the recess is narrower than the maximum interior width. The provision of two recesses in the blocks of both an outer layer 26 of the wall section and an inner layer 27 of the wall section enables the blocks to be arranged in staggered relationship, the outer faces of the blocks having the appearance of a normal brick and mortar wall with blocks of one course overlapping the joins in the course below. The blocks A and C to G are shaped to allow this staggered relationship to continue around corners. The vertical and horizontal overlapping of blocks thus results in a structure which is aesthetically attractive and relatively strong. The blocks have grooves 28 in each edge face which mate to form grouting channels which are slurried separately on each course during assembly. It should be noted that the staggered construction results in the grouting channels in each course being blocked at both ends, so avoiding the coincident grouting channels formed in some prior art systems. Coincident grouting channels have the disadvantage that channels extending over several courses can all be slurried at once with the tendency for grout to harden before reaching the bottom courses, if it reaches them at all. The range of block shapes provided ensures that the overlapping of layers and consecutive courses can be continued through offsets and through connections to internal room-dividing walls.

Referring to FIG. 9, a wall built from blocks of a second configuration in accordance with the invention has an outer layer 31, an inner layer 32, and an intermediate layer 33. The blocks of the inner and outer layers are similar to those of the first configuration with planar exposed faces and with paired recesses on their inner faces. On the other hand, the intermediate layer has blocks with paired recesses on both faces. As with the first configuration, a wall using these blocks can be produced with horizontally overlapping consecutive courses and with vertically staggered adjacent layers. The three layer configuration allows a different material (e.g. thermally insulating material) to be used for the internal layer, and in some circumstances can be more versatile and relatively easy to assemble.

A third configuration, shown in FIG. 10 makes use of the paired recess feature to create a block of lighter construction which can be used to build a wall having relatively large voids 34 between inner and outer layers. The blocks may be used to produce walls with non-perpendicular connections, this example having walls 35 and 36 arranged at 120° to each other. The voids may be filled with thermal insulation material.

I claim:

1. A method of manufacturing a machine mould for the continuous casting in cycles of a plurality of dry wall building blocks of substantially constant cross-section, the method comprising:

(i) providing at least one master form of a shape and dimensions corresponding to the shape and dimensions of the required finished block;

(ii) positioning a plurality of metal liners against side faces of the or each master form, each liner defining a wear surface and being positioned with the wear surface laid face-to-face on a respective side face of the master form so as to form a mould cavity or cavities reproducing at least in part the shape of the master form or forms;

(iii) filling the spaces around the or each master form and liners to a required height with a liquid casting compound which is then allowed to set; and (iv) removing the or each master form to leave a female mould having a mould cavity or cavities corresponding in shape to the shape of the master form or forms.

2. A method according to claim 1, wherein the or each master form is a cast item produced by building a collapsible female core-box, pouring a liquid casting compound into the core-box, allowing the compound to set, and disassembling the core-box.

3. A method according to claim 2 wherein the or each master form is cast around a mandrel for locating the finished master form or a planar casting surface.

4. A method according to claim 1 wherein each liner comprises a metal plate having pre-drilled holes, and wherein, prior to filling the spaces around the master forms and liners, fixing bolts are inserted in the holes with the bolts extending into threaded blocks situated in the said spaces to provide a means for fixing replacement liners to the finished mould.

5. A method according to claim 1 wherein the compound for filling the spaces around the masters forms and liners is a cold-pouring liquid compound having an alkali base into which an acid hardening additive is mixed prior to pouring 6. A method according to claim 5, wherein the master forms are cast from the said compound.

7. A machine mould manufactured by a method as defined in claim 1 for the casting of dry wall building blocks, the mould comprising:

a planar base member, a mould body or body portions supported on the base member and cast thereon using the said casting compound, the mould body or body portions defining at least one mould cavity lined with a plurality of metal planar liners removably attached to the mould body or body portions, the or each mould cavity being of constant cross-section and having sides perpendicular to the base member.

8. A mould according to claim 7, wherein at least some of the liners are secured to the mould body or body portions by countersunk bolts threaded in blocks embedded in the mould body or body portion.

9. A mould according to claim 7 wherein the mould body is bounded on its sides by a metal shell secured to the base member and defining a mould box, and wherein an upper surface of the mould body is covered by protective plate means secured to the mould body or body portions and having apertures in registry with the mould cavity or cavities.

10. A mould according to claim 7 wherein the liners each comprise a steel plate of case hardened tool-steel, gauge plate or hard-chromed steel.

11. A mould according to claim 9 including bracing ties connecting opposite sides of the shell.

12. A mould according to claim 11, wherein the ties are located in spaces between mould body portions.

13. A method of manufacturing a machine mould for the continuous casting in cycles of a plurality of dry wall building blocks of substantially constant cross-section, the method comprising:

(i) providing at least one master form of a shape and dimensions corresponding to the shape and dimensions of the required finished block;

(ii) laying a plurality of metal liners against side faces of the or each master form in a face-to-face relationship;

(iii) locating a plurality of liner securing means in the spaces around the or each master form and liners;

(iv) filling the spaces to a required height with a liquid casting compound, and allowing the casting compound to set;

(v) removing the or each master form to leave a female mould having one or more mould cavities having renewable moulding surfaces formed at least in part by the surfaces of the liners originally laid against the master form or forms, the liners being backed by the set casting compound.

14. A method of casting is cycles a plurality of dry wall building blocks of substantially constant cross-section, the method comprising:

(i) providing at least one master form of a shape and dimensions corresponding to the shape and dimensions of the required finished block;

(ii) positioning a plurality of metal liners against side faces of the or each master form, each liner defining a wear surface and being positioned with the wear surface laid face-to-face on a respective side face of the master form so as to form a mould cavity or cavities reproducing at least in part the shape of the master form or forms;

(iii) filling the spaces around the or each master form and liners to a required height with a liquid casting compound which is then allowed to set;

(iv) removing the or each master form to leave a female mould having a mould cavity or cavities corresponding in shape to the shape of the master form or forms;

(v) mounting the mould in a block making machine;

(vi) filling the mould cavity or cavities with a cement-/said mixture to form one or a plurality of said blocks;

(vii) removing the block or blocks from the mould; and (viii) repeating steps (vi) and (vii) until a required number of blocks has been produced.

* * * * *